United States Patent
Ether

(10) Patent No.: US 7,510,058 B2
(45) Date of Patent: Mar. 31, 2009

(54) ELECTRIC PARK BRAKE MECHANISM AND METHOD OF OPERATING AN ELECTRIC BRAKE TO PERFORM A PARK BRAKE FUNCTION

(75) Inventor: Russ Ether, Niles, MI (US)

(73) Assignee: Honeywell International Inc., Morristown, NJ (US)

( * ) Notice: Subject to any disclaimer, the term of this patent is extended or adjusted under 35 U.S.C. 154(b) by 185 days.

(21) Appl. No.: 10/880,041

(22) Filed: Jun. 29, 2004

(65) Prior Publication Data

US 2005/0109568 A1    May 26, 2005

Related U.S. Application Data

(60) Provisional application No. 60/524,643, filed on Nov. 25, 2003.

(51) Int. Cl.
*F16D 65/36* (2006.01)
*F16D 55/02* (2006.01)

(52) U.S. Cl. .......... 188/156; 188/67; 188/171; 188/265

(58) Field of Classification Search ......... 188/156–159, 188/161, 163, 171, 71.6, 72.3, 67, 265
See application file for complete search history.

(56) References Cited

U.S. PATENT DOCUMENTS

| | | | |
|---|---|---|---|
| 3,741,353 A | | 6/1973 | McKinley et al. |
| 4,691,801 A | | 9/1987 | Mann et al. |
| 4,773,210 A | * | 9/1988 | Landwehrkamp et al. ..... 57/406 |
| 5,040,573 A | * | 8/1991 | Shepard ...................... 140/104 |
| 5,185,542 A | | 2/1993 | Lazorchak |
| 5,415,252 A | | 5/1995 | Estkowski |
| 5,443,132 A | | 8/1995 | Arnold |
| 5,577,578 A | | 11/1996 | Lazorchak |
| 5,582,275 A | * | 12/1996 | Arnold ....................... D9/415 |
| 5,785,157 A | | 7/1998 | Scott et al. |
| 5,829,845 A | | 11/1998 | Maron et al. |
| 5,913,710 A | * | 6/1999 | Tessmann et al. ............. 451/10 |
| 5,949,168 A | | 9/1999 | Dieckmann et al. |
| 6,060,797 A | * | 5/2000 | Harris et al. .................. 310/14 |
| 6,322,161 B1 | | 11/2001 | Maslonka et al. |
| 6,325,471 B1 | | 12/2001 | Curran et al. |
| 6,530,625 B2 | | 3/2003 | Arnold et al. |
| 6,545,852 B1 | | 4/2003 | Arnold |
| 2003/0010583 A1 | | 1/2003 | Arnold et al. |
| 2003/0042802 A1 | * | 3/2003 | Pierre et al. ................... 310/36 |
| 2003/0160503 A1 | * | 8/2003 | Riddiford et al. .............. 303/3 |

FOREIGN PATENT DOCUMENTS

EP    0520525 A    12/1992

* cited by examiner

*Primary Examiner*—Melody M Burch
(74) *Attorney, Agent, or Firm*—Birch, Stewart, Kolasch & Birch, LLP

(57) ABSTRACT

An electromechanical braking system includes a brake rotor, a brake stator, an EMA (52) having a rotor shaft (36), a ram (42) operably connected to the EMA (52) having a first end movable between a first position urging the brake stator against the brake rotor and a second position, a clamp device (32) shiftable between a first clamping position in clamping engagement with the rotor shaft (36) and a second clamping position and a clamp controller (46) for shifting the clamping device (32) between the first and second clamping positions. Also a method of using the braking system as a parking brake.

22 Claims, 7 Drawing Sheets

ELECTRIC PARK BRAKE MECHANISM AND METHOD OF OPERATING AN ELECTRIC BRAKE TO PERFORM A PARK BRAKE FUNCTION

CROSS REFERENCE TO RELATED APPLICATIONS

The present application claims the benefit of U.S. Provisional Patent Application No. 60/524,643, filed Nov. 25, 2003, the entire contents of which are hereby incorporated by reference.

FIELD OF THE INVENTION

This invention relates to braking systems utilizing electromechanical actuators, and more particularly to a method and apparatus for implementing a parking brake function for an electromechanically actuated aircraft brake.

BACKGROUND OF THE INVENTION

Braking systems using electromechanical actuators (EMAs) have been considered as alternatives to conventional hydraulic braking arrangements. In one previously disclosed aircraft braking arrangement using EMAs, a plurality of EMAs are mounted on a brake carrier housing in an annular pattern about the axis of wheel rotation. The brake carrier housing is fixed to a torque tube having stator disks of a brake disk stack attached thereto. Rotor disks of the brake disk stack, which extend between the stator disks attached to the torque tube so that rotor and stator disks alternate, are fixed to and rotatable with the wheel that rotates about an axis. The EMAs are selectively energized in response to a braking command, causing a motor-driven, reciprocating actuator piston ("ram") to extend and engage with a pressure plate positioned on one end of the brake disk stack so as to compress the brake disk stack and retard wheel rotation. One EMA-based braking system is disclosed U.S. Pat. No. 6,530,625, titled "Electrically Actuated Brake With Vibration Damping," the entire contents of which are herby incorporated by reference.

The commercial need that one aspect of the present invention is intended to solve is how to implement a parking brake function on an electromechanically actuated aircraft brake which effectively addresses the following design constraints: (1) the parking brake should effectively hold without requiring the continuous application of power; and (2) the failure mode of the park brake should be such that loss of power does not automatically actuate the park brake. Item (1) above is desirable because only limited-capacity battery power may be available while the aircraft is parked and the engines turned off. The total energy required by the park brake to hold the aircraft should be a small percentage of the battery's energy storage capacity so as not to discharge the battery. The constraint described in item (2) above arises from safety considerations. Loss of power to the electric brake system should not result in uncommanded braking. Uncommanded braking is considered a more serious failure mode than loss of braking. Attempting to implement a park brake function by simply locking the brake actuators in a fixed position does not solve the problem because of the effects of differential thermal expansion in the brake heat stack. As the heat redistributes, and differential thermal expansion takes place, the clamping force resulting from a locked actuator changes.

SUMMARY OF THE INVENTION

These problems and others are addressed by the present invention, which comprises, in a first aspect, an electromechanical braking system comprising a brake rotor, a brake stator, an EMA having a rotor shaft, and a ram operably connected to the EMA. The ram has a first end movable between a first position urging the brake stator against the brake rotor and a second position. A bistable clamp is provided for engaging the rotor shaft and an element shifts between a first condition to cause the clamp to clampingly engage the rotor shaft and a second condition to cause the clamp to release the rotor shaft. A clamp actuator shifts the element between the first and second conditions.

Another aspect of the invention comprises a method of performing a parking brake function using an electromechanical brake having a disk stack that involves providing an EMA including a ram and a rotatable shaft, rotating the shaft in a first direction to move the ram against the disk stack to apply a given level of force to the disk stack, clamping the shaft when the given level of force is applied, and then powering down the EMA.

A further aspect of the invention comprises a method of controlling an electromechanical braking system having a disk stack that involves, a) providing an EMA including a rotatable shaft operably connected to a ram, b) applying a given level of force to the disk stack, c) securing the shaft when the given level of force is applied, d) powering down the EMA, e) reapplying the given level of power to the EMA, f) releasing the shaft, g) re-securing the shaft, and h) powering down the EMA.

Another aspect of the invention comprises an electromechanical parking brake comprising a brake disk stack, an EMA, and a shaft rotatably connected to the EMA. The shaft has a first end movable between a first position spaced from the brake disk stack and a second position in engagement with the brake disk stack by rotation of the shaft. A bistable clamp is provided that has first and second clamping portions for engaging the rotor shaft, and an element is provided that is shiftable between a first position for causing the first and second portions to clampingly engage the rotor shaft and a second position causing the first and second portions to release the rotor shaft. A clamp actuator shifts the element between the first and second positions, while an EMA controller controls the EMA. The EMA controller is shiftable between an active state and a dormant state, and a hardware timer circuit controls the shifting of the EMA controller between the active state and the dormant state.

An additional aspect of the invention comprises an electromechanical parking brake that includes a brake device for braking a vehicle, an EMA device for actuating the brake means, a bistable clamp device for selectively preventing movement of a portion of the EMA device, and a control device for controlling the clamp device.

Another aspect of the invention comprises an electromechanical braking system that includes at least one stator movable into contact with at least one rotor to brake the at least one rotor, an EMA for moving the stator, a bistable clamp for selectively preventing movement of a portion of the EMA, and a controller for controlling the clamp.

BRIEF DESCRIPTION OF THE DRAWINGS

These aspects of the invention and others will be better understood after a reading of the following detailed description together with the following drawings, wherein.

DETAILED DESCRIPTION

In one aspect, an embodiment of the present invention is an EMA braking arrangement having a parking brake function. According to another aspect, an embodiment of the present invention is a method for controlling an EMA braking arrangement having a parking brake function. Other aspects of embodiments of the present invention will become evident from the following description, with reference to the drawings.

An embodiment of the present invention solves the above-described problems so as to: minimize power consumption during parking function; avoid uncommanded braking when power is lost; and avoid loss of park brake holding force due to differential thermal expansion. In one embodiment, these results are achieved by combining two technologies: (1) a mechanically or magnetically bistable securing or clamping mechanism which can be electrically commanded with a momentary pulse of power to lock (or unlock) the motor shaft of the EMA in order to "set" (or release) the park brake; and (2) a low-power hardware timer circuit designed to "wake up" the electromagnetic actuator controller from a dormant state at specified intervals and cause the EMA to refresh the park brake force (re-set the park brake) to counter the effects of thermal expansion. This cycling continues until the brake is thermally stable and the cycling is no longer required. The total energy consumed during this process is a fraction of the aircraft battery's energy storage capacity.

Figure 1:
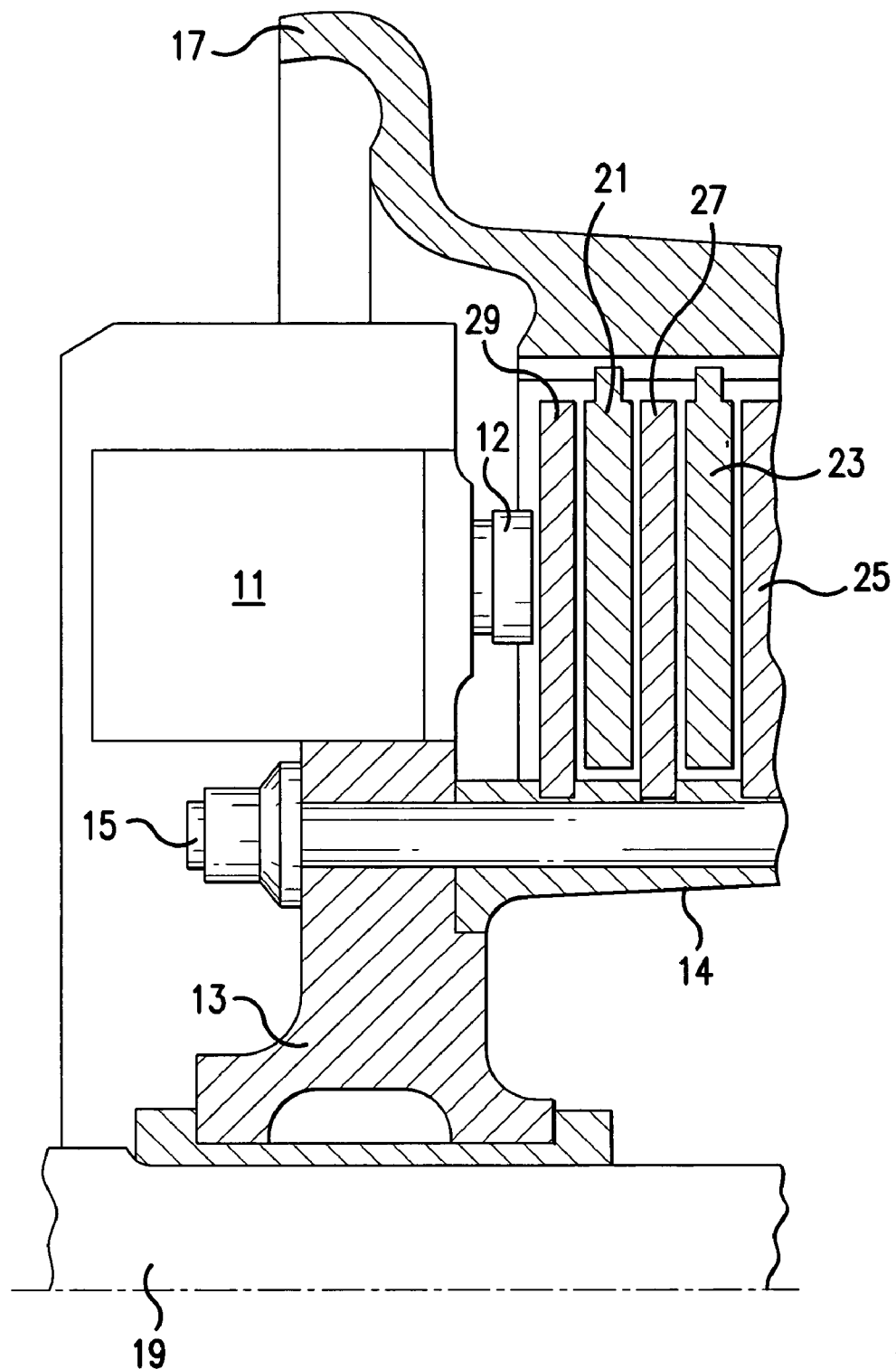
FIG. 1 is a cross sectional view of a portion of a conventional vehicle wheel and brake assembly showing one EMA.

In the wheel and brake assembly of FIG. 1, an illustrative EMA 11 of brake carrier housing 13 is fixed to torque tube 14 by bolts 15. A wheel 17 is journalled for rotation about the axle 19. A brake disk stack has alternate rotor disks, such as a first rotor disk 21 and a second rotor disk 23, fixed to and rotatable with the wheel 17 while intervening stator disks, such as a first stator disk 25 and a second stator disk 27, are stationary and fixed to torque tube 14 connected with brake carrier housing 13. When actuator 11 (along with a plurality of similar annularly disposed actuators) is energized, piston 12 extends forcing the brake pressure plate disk 29 to compress the disk stack and slow the vehicle as is conventional in multi-disk brake assemblies.

Figure 2:
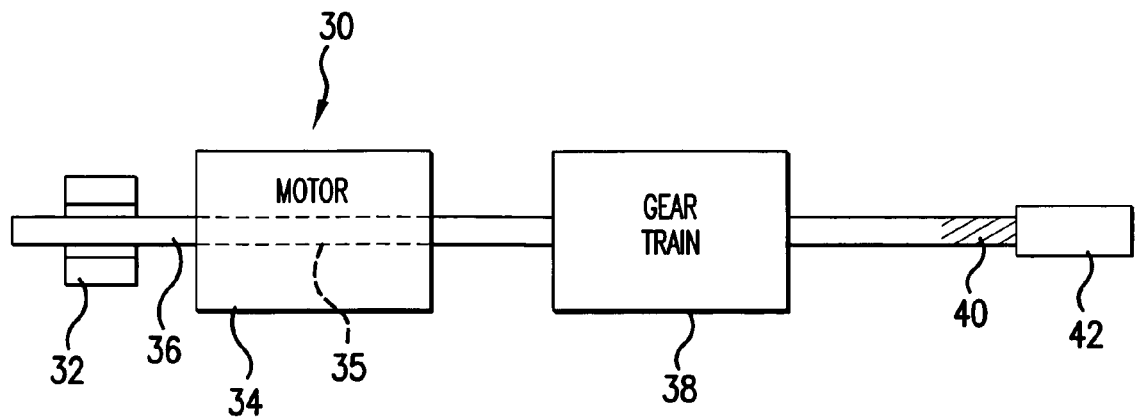
FIG. 2 is a block diagram of an EMA-based braking arrangement with a parking brake function in accordance with an embodiment of the present invention.

FIG. 2 illustrates an EMA braking arrangement 30 in accordance with an embodiment of the present invention. As shown in FIG. 2, the EMA braking arrangement 30 of this embodiment includes: a clamping device 32, which may be a bistable clamping device; a motor 34 having a rotor 35; a shaft 36 turned by rotor 35; a gear train 38 connected to the motor 34 to amplify torque; and a ball screw 40 and a piston 42 for translating rotary motion from the gear train 38 to linear motion so as to engage/disengage the piston 42 with the pressure plate of a brake disk stack. Elements 34, 35, 36, 38, 40 and 42 collectively comprise EMA 52 of FIG. 3. Clamping device 32 may also be considered an element of EMA 52 or it may be provided as a separate element that operates in conjunction with EMA 52. The parking brake mechanism may be configured to work with a brake disk stack like the one shown in FIG. 1. In this case, EMA 52 is selectively energized in response to a braking command and causes piston 42 to extend and engage a pressure plate positioned on one end of a brake disk stack to compress the brake disk stack and retard wheel rotation. Thus, a typical braking assembly will include a plurality (e.g., 2, 4, 5, etc.) of EMAs per wheel.

The bistable clamping device 32 is mounted to the shaft 36 of the EMA's rotor 35 or to any shaft operatively connected to rotor 35. The clamping device 32 is stable in either of two positions: clamped or unclamped. The clamping device 32 requires no power to remain in either position and merely a momentary pulse of power to change positions. This may be accomplished by, for example, using an actuator to shift a control element, such as a lever or plunger, for example, between first and second positions. Thus, an embodiment of the present invention provides a park brake mechanism that will not automatically engage upon loss of power.

Figure 5:
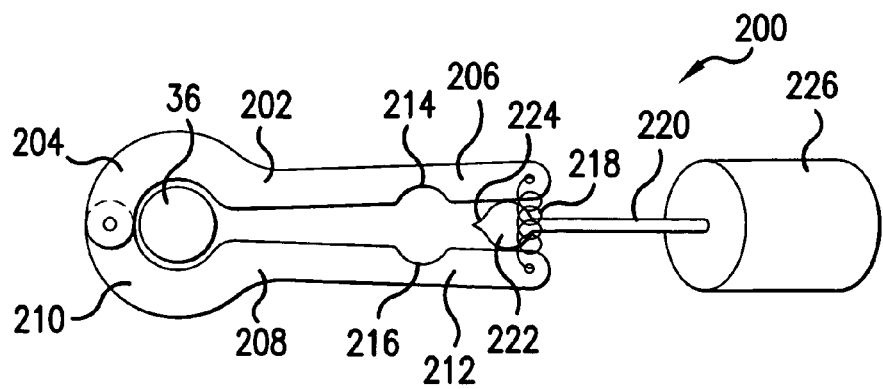
FIG. 5 is a side elevational view of a first mechanically actuated bistable clamping device suitable for use with the present invention in a first position unclamped from a shaft.
Figure 6:
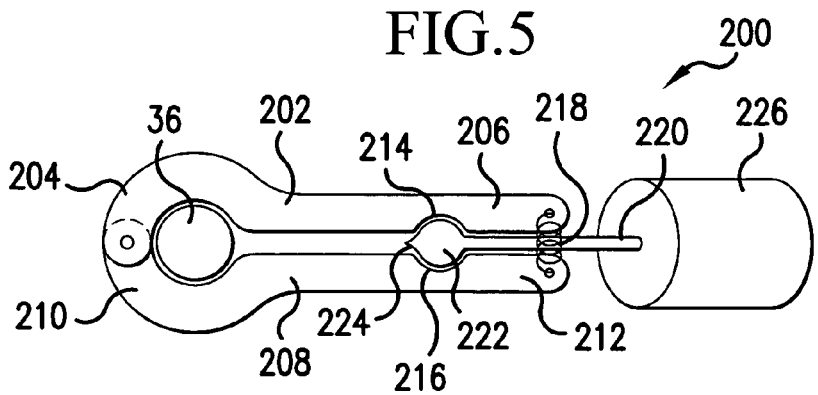
FIG. 6 is a side elevational view of the bistable clamping device of FIG. 5 in a second, clamped, position.

Clamping device 32 may be mechanically shifted between clamped and unclamped states or shifted magnetically. An example of a suitable bistable mechanical clamping device 200 is shown in FIGS. 5 and 6. Clamping device 200 includes a first jaw 202 having a first end 204 and a second end 206 and a second jaw 208 having a first end 210 pivotally connected to first end 204 of first jaw 202 and a second end 212. A portion of shaft 36 is received between the first and second jaws 202, 208 and held in place when the jaws 202, 208 are moved toward each other and engage the shaft 36. First jaw 202 further includes a detent 214 opposite a detent 216 in second jaw 208. A spring 218 is connected between first jaw second end 206 and second jaw second end 212 and biases first jaw 202 and second jaw 208 toward each other and into engagement with shaft 36. The force of spring 218 is applied at the ends of the lever arms formed by first jaw 202 and second jaw 208 which magnifies the force applied on shaft 36 by spring 218.

The position of jaws 202, 208 is controlled by a piston or plunger 220 having a first enlarged end 222 with cam surfaces 224 and a second end (not shown) located within a solenoid 226 which shifts the plunger 220 between first and second positions with respect to the solenoid. In a first, retracted position, illustrated in FIG. 5, enlarged end 222 of plunger 220 holds second ends 206 and 212 apart from one another enough to allow shaft 36 to rotate freely between jaws 202, 208. When plunger 220 is extended to the position shown in FIG. 6, enlarged end 222 is received in detents 214, 216 thereby allowing spring 218 to move the second ends 206, 212 of the first and second jaws 202, 208 toward one another and into contact with shaft 36. Spring 218 is sized to hold jaws 202, 208 against shaft 36 with sufficient force to hold shaft 36 substantially immobile under normal operating conditions. Detents 214, 216 securely hold enlarged end 222 in place even when no power is supplied to solenoid 226.

When plunger 220 is shifted from the extended position of FIG. 6 toward the retracted position of FIG. 5, cam surfaces 224 engage detents 214, 216 to force the first and second jaws apart as the plunger retracts. Moreover, cam surfaces 224 are configured so that the closing force exerted on enlarged end 222 of plunger 220 by jaws 202, 208 tends to force plunger 220 toward solenoid 226. Thus, even when solenoid 226 is not active, plunger 220 is biased toward the solenoid 226.

Figure 7:
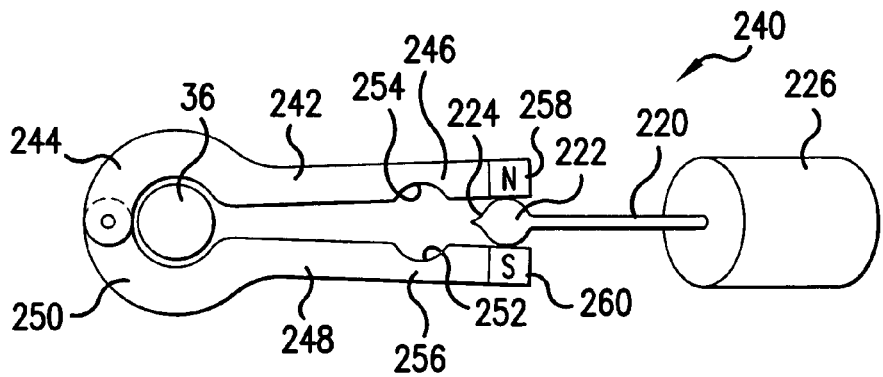
FIG. 7 is a side elevational view of a first magnetically actuated bistable clamping device suitable for use with the present invention in a first position unclamped from a shaft.
Figure 8:
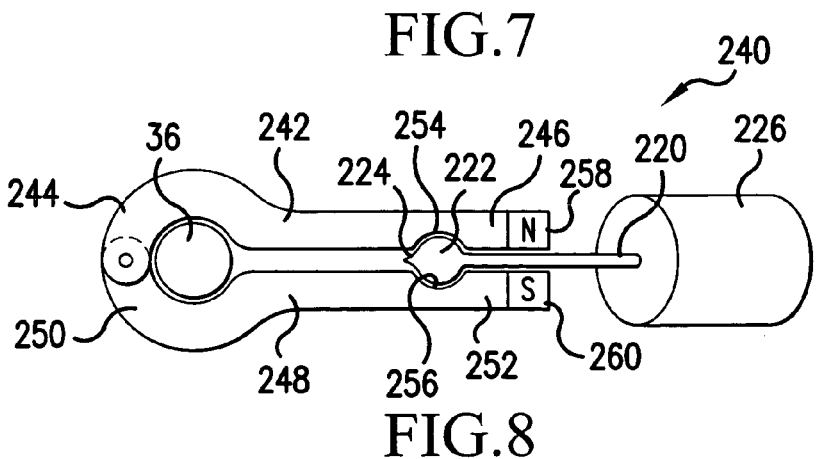
FIG. 8 is a side elevational view of the bistable clamping device of FIG. 7 in a second clamped, position.

An example of a suitable bistable magnetic clamping device 240 is shown in FIGS. 7 and 8. Clamping device 240 includes a first jaw 242 having a first end 244 and a second end 246 and a second jaw 248 having a first end 250 pivotally connected to first end 244 of first jaw 242 and a second end 252. A portion of shaft 36 is received between the first and second jaws 242, 248 and held in place when the jaws 242, 248 are moved toward each other so that they engage the shaft 36. First jaw 242 includes a detent 254 opposite a detent 256 in second jaw 248. First jaw second end 244 comprises a first permanent magnet 258 having a first polarity while second jaw second end 252 comprises a second permanent magnet 260 having a second polarity opposite the first polarity. First jaw magnet 258 and second jaw magnet 260 are strongly attracted to each other, and, when not held in a spaced relation by enlarged end 222 of plunger 220, cause the first and second jaws 242, 248 to clamp shaft 36. Plunger 220 is moved by solenoid 226 to selectively space the first and second jaws in the manner described above in connection with the previous embodiment. An internal stop (not shown) in solenoid 226 keeps plunger 200 from moving too far into the solenoid.

Figure 9:
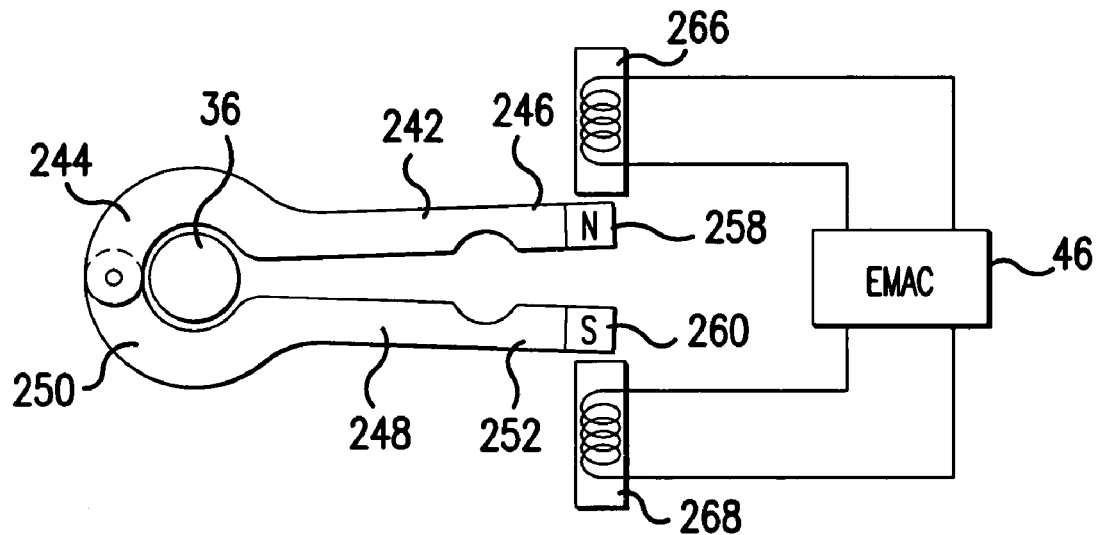
FIG. 9 is a side elevational view of a second magnetically actuated bistable clamping device suitable for use with the present invention in a first position unclamped from a shaft.
Figure 10:
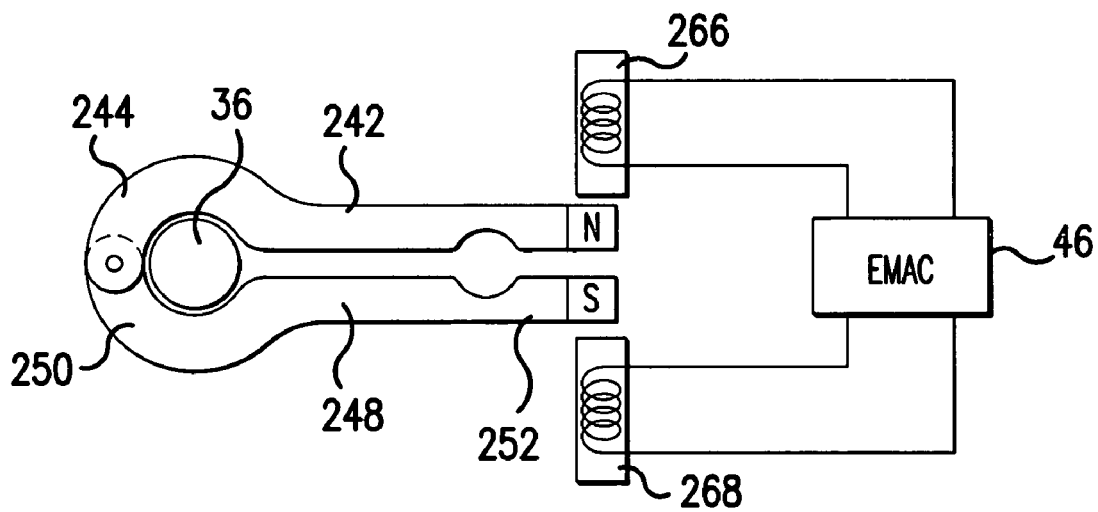
FIG. 10 is a side elevational view of the bistable clamping device of FIG. 9 in a second clamped, position.

A second embodiment of a magnetically actuated bistable clamping device is illustrated in FIGS. 9 and 10 wherein the same reference numerals are used to identify elements common to earlier embodiments. This clamping in addition to many of the elements discussed in connection with the embodiment illustrated in FIGS. 7 and 8, includes a first electromagnet 266 adjacent magnet 258 on the first jaw 242 and a second electromagnet 268 adjacent magnet 260 on second jaw 248. No plunger or solenoid is required in this embodiment.

EMAC 46 controls the current flowing through the windings of the first and second electromagnets 266, 268 and causes the ends of electromagnets 266, 268 closest to jaws 242, 248 to assume a north or south polarity depending on the direction of current flow. FIG. 9 illustrates the first and second permanent magnets 258, 260 attracted to the metal in first and second electromagnets 266, 268 when no current is flowing in the electromagnet coils. The magnetic attraction between magnet 258 and electromagnet 266 and the magnetic attraction between magnet 260 and electromagnet 268 is stronger than the mutual attraction between first and second permanent magnets 258, 260, and thus first and second jaws 242, 248 are maintained in a spaced position as shown in FIG. 9 even when no power is applied to the electromagnets 266, 268.

In order to shift the first and second jaws 242, 248 toward each other and clamp shaft 36, a momentary current pulse is supplied to electromagnet 266 to repel first permanent magnet 258 while an opposite current pulse is supplied to electromagnet 268 to repel second permanent magnet 260. The first and second permanent magnets 258, 260 are thus pushed toward one another at which point the mutual attraction between first and second permanent magnets 258, 260 pulls them toward one another and cause jaws 242, 248 to clampingly engage shaft 36. The mutual attraction between the permanent continues to hold the jaws in place even when current flow to the electromagnets 266, 268 is stopped. The jaws 242, 248 are shifted back to the spaced position shown in FIG. 9 by reversing the direction of current flow to electromagnets 266, 268 to separate the jaws 242, 248.

Figure 11:
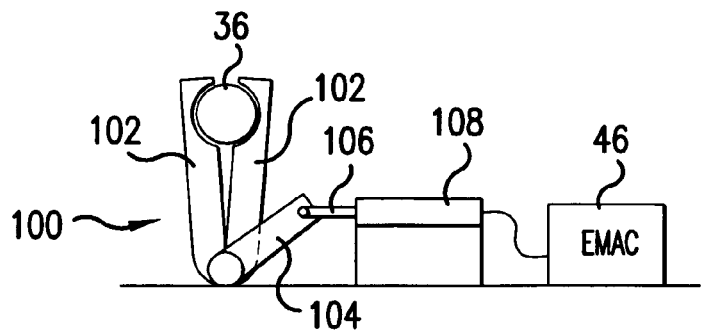
FIG. 11 is a side elevational view of a second mechanically actuated bistable clamping device suitable for use with the present invention in a first position unclamped from a shaft.
Figure 12:
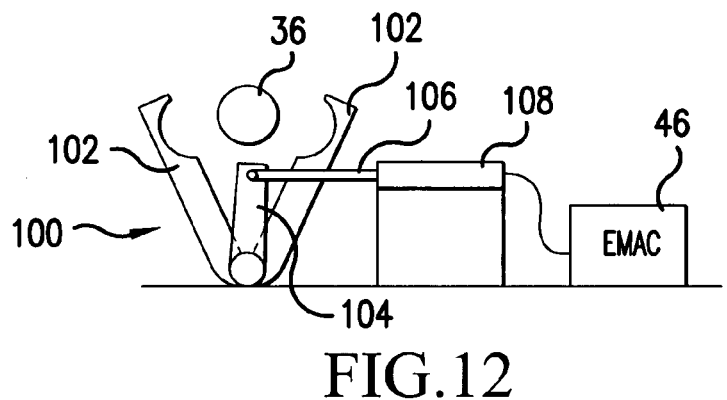
FIG. 12 is a side elevational view of the bistable clamping device of FIG. 11 in a second, clamped, position.

A second example of a mechanically bistable clamping device 100 is illustrated in FIGS. 11 and 12 and includes first and second jaws 102 the position of which is controlled by movement of control lever 104. Moving control lever 104 between a first position shown in FIG. 11 and a second position shown in FIG. 12 shifts the jaws 102 from a clamping to an unclamping position. Control lever 104 is connected to the piston 106 of a solenoid controlled actuator 108. Actuator 108 shifts piston 106 between the first position shown in FIG. 11 and the second position shown in FIG. 12 under the control of EMAC 46. Lever 104 may be of a "snap-action" type so that it remains in one of two positions even if actuator 108 loses power. A light switch, for example, has such a bistable or snap-action quality. Other mechanically actuated clamping devices that remain in one state or another without the application of force could also be employed.

Figure 13:
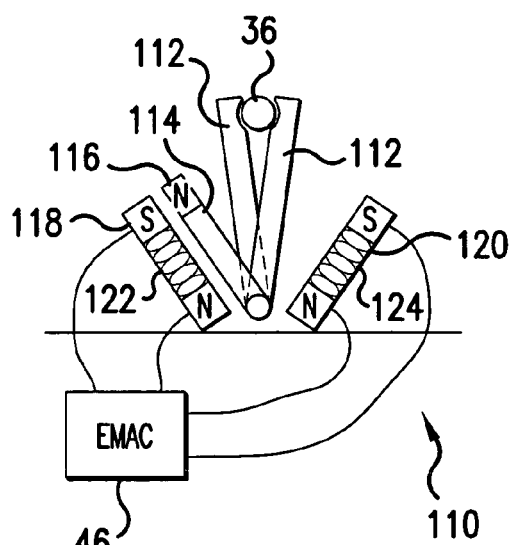
FIG. 13 is a side elevational view of a third magnetically actuated bistable clamping device suitable for use with the present invention in a first position unclamped from a shaft.
Figure 14:
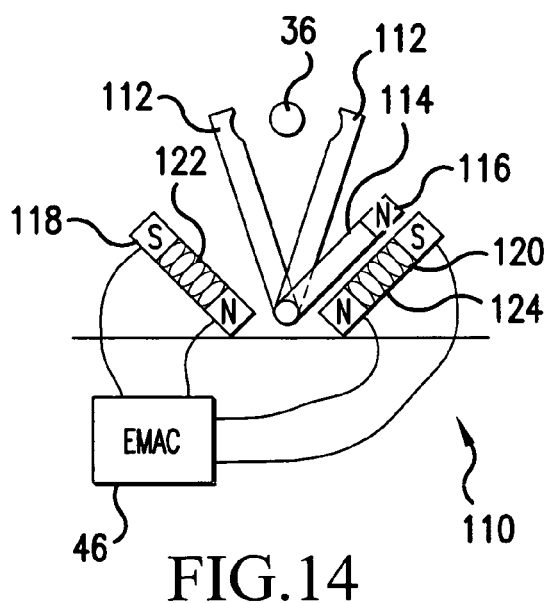
FIG. 14 is a side elevational view of the bistable clamping device of FIG. 13 in a second clamped, position.

A third example of a suitable magnetically bistable clamping device 110 is shown in FIGS. 13 and 14. Clamping device 110 includes first and second jaws 112 movable between a first position shown in FIG. 13 in clamping engagement with shaft 36 and a second position shown in FIG. 14 spaced from shaft 36 under the control of control lever 114. Control lever 114 comprises a permanent magnet 116 having a first polarity at its distal end, north in the present example. Lever 114 is mounted between first and second permanent magnets 118, 120 each of which includes a distal end having a polarity opposite to that of the magnet 116 at distal end of lever 114. Thus, once permanent magnet 116 is placed near permanent magnet 118 or 120 it will remain in position due to the attraction of the permanent magnets.

Permanent magnets 118 and 120 also comprise the cores of electromagnets formed by first and second coils 122, 124 wrapped around magnets 118 and 120 which coils 122, 124 are connected to a EMAC 46. To shift control lever 114 from the position shown in FIG. 13 to the position shown in FIG. 14, a current is applied to first coil 122 in a direction so as to temporarily reverse the polarity of permanent magnet 118 and repel magnet 116 from permanent magnet 118. Optionally, coil 124 may also be energized to attract permanent magnet 116. The current direction is reversed to shift lever 114 in the opposite direction. Once lever 114 is in the desired position, power is disconnected from the first and second coils 122, 124 and lever 114 remains in position due to the attraction between the permanent magnets. Other magnetically actuated clamping devices that remain in one state or another without the application of energy could also be employed, or a combination of mechanical and magnetic bistable actuators could be used, such as, for example, would be the case if the control lever 114 described above were itself mechanically bistable.

Figure 15:
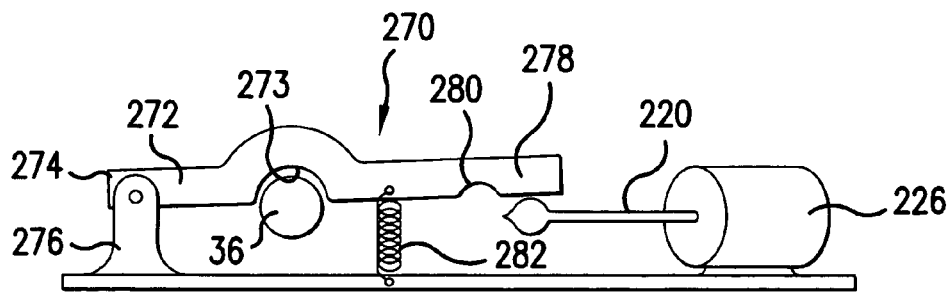
FIG. 15 is a side elevational view of a mechanically bistable securing element for securing a shaft in accordance with the present invention shown in a first position spaced from a shaft.
Figure 16:
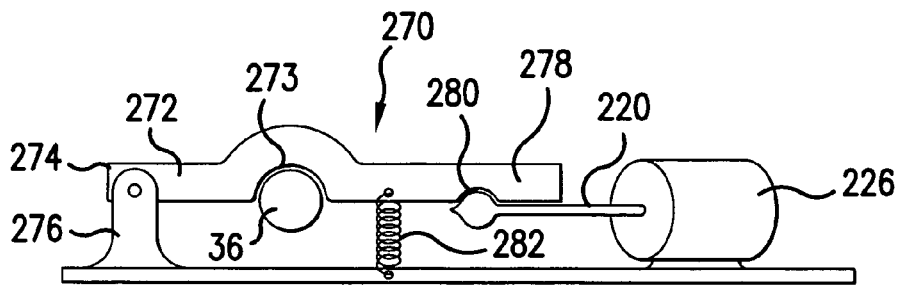
FIG. 16 is a side elevational view of the securing element of FIG. 15 shown in a second position engaging a shaft.

In an alternate embodiment, a securing device 270, illustrated in FIGS. 15 and 16, is used to secure shaft 36 instead of a clamping device 32. While this arrangement reduces the number of elements required for securing shaft 36, it also imposes side loads on shaft 36, which may be undesirable in some situations. Securing device 270 includes a first securing element 272 that is substantially similar in shape to one of the jaws 202, 208 of the clamp of embodiment of FIG. 5, and includes a first end 274 pivotally connected to a support 276 and a second end 278. Securing element 272 further includes a detent 280. An arcuate portion 273 of securing element 272 is configured to receive a portion of shaft 36 and substantially prevent the rotation of shaft 36 when the securing element 272 is held thereagainst by a biasing element such as a spring 282. A solenoid 226 and a plunger 220 are provided as in the earlier embodiments.

In a first, retracted position, illustrated in FIG. 15, enlarged end 222 of plunger 220 holds arcuate portion 273 of securing element 272 away from shaft 36 to allow shaft 36 to rotate freely. When plunger 220 is extended to the position shown in FIG. 16, enlarged end 222 is received in detent 280 thereby allowing spring 282 to move the arcuate portion 273 of securing element 272 toward and into contact with shaft 36. Spring 282 is sized to hold securing element 272 against shaft 36 with sufficient force to hold shaft 36 substantially immobile under normal operating conditions. Detent 280 securely holds enlarged end 222 in place even when no power is supplied to solenoid 226.

Figure 17:
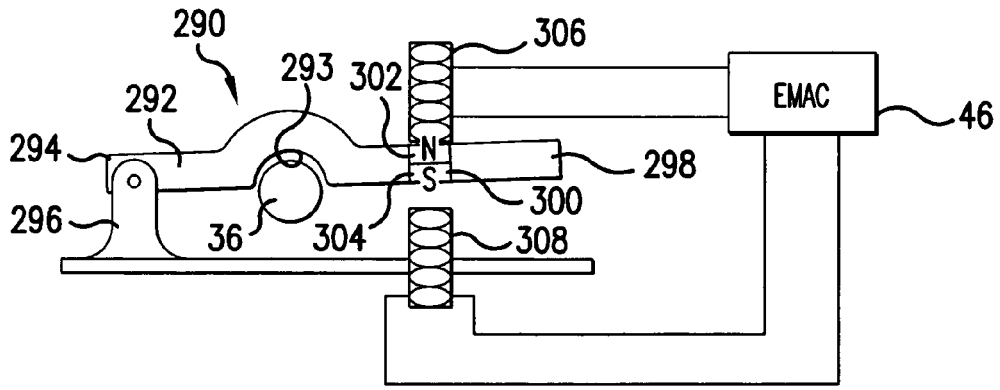
FIG. 17 is a side elevational view of a magnetically bistable securing element for securing a shaft in accordance with the present invention shown in a first position spaced from a shaft.
Figure 18:
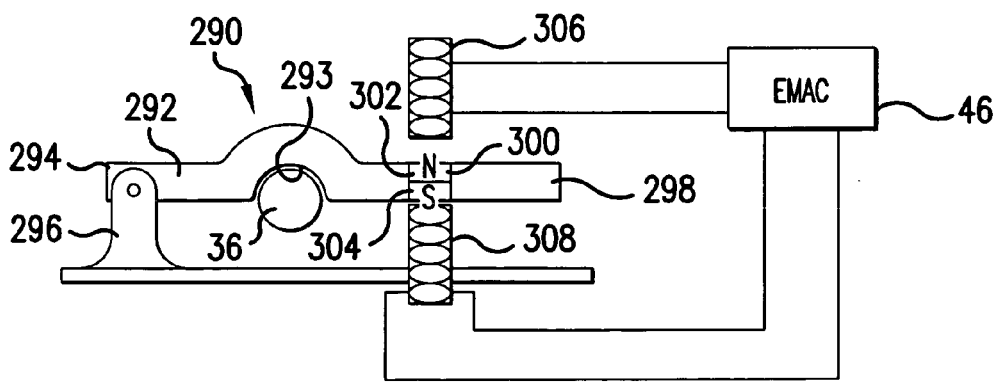
FIG. 18 is a side elevational view of the securing element of FIG. 17 shown in a second position engaging a shaft.

A magnetically bistable securing device 290 is illustrated in FIGS. 17 and 18. Securing device 290 includes a first securing element 292 that is substantially similar in shape to securing element 272 of FIG. 15 and includes an arcuate portion 293, a first end 294 pivotally connected to a support 296 and a second end 298. Arcuate portion 293 is configured to receive a portion of shaft 36 and substantially prevent the rotation of shaft 36 when held thereagainst by a magnetic biasing arrangement described hereafter.

Securing element 292 includes a permanent magnet 300 having a north end 302 and a south end 304 positioned between first and second electromagnets 306, 308 the polarity of which is controlled by a controller such as EMAC 46. In a first position shown in FIG. 17, north pole 302 of permanent magnet 300 is shown attracted to the metal in electromagnet 306, thereby holding arcuate portion 293 away from shaft 36. To secure shaft 36, momentary pulses of current are sent to electromagnets 306, 308 to force magnet 300 and hence securing element 292 away from first electromagnet 306 and toward second electromagnet 308. Permanent magnet 300 remains attracted to the metal in second electromagnet 308 even when power to the electromagnets is stopped. Shaft 36 is released by sending second current pulses to the electromagnets to move magnet 300 back into contact with first electromagnet 306.

When in the clamped position, the clamping device prevents the rotor 35 from turning, thus locking the EMA piston at its then-current location. Power can be removed from motor 34, and the piston will continue exerting force on the brake. The EMA may be referred to as being in a "powered down" condition when power is removed therefrom and in a "powered up" condition when power is applied. Thus, an embodiment of the present invention provides a park brake mechanism which requires no power to remain actuated.

If the park brake is set while the brake is hot, then as the brake cools the force exerted by the piston 42 may change due to differential thermal expansion/contraction of the brake disk stack, even though the clamping device 32 or a securing device holds shaft 36 immobile.

Figure 3:
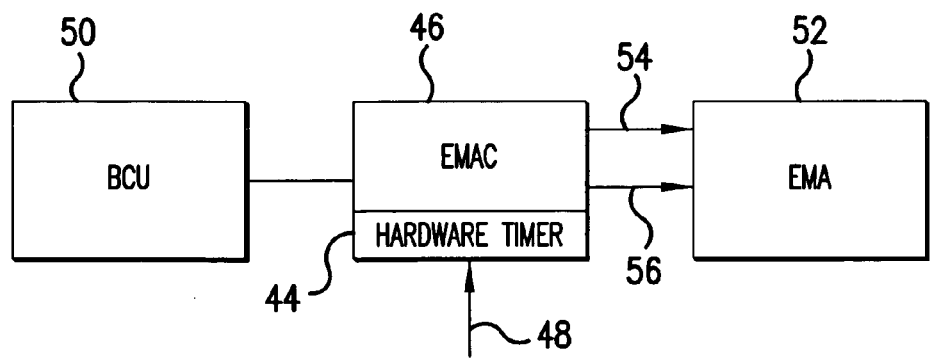
FIG. 3 is a block diagram illustrating components for controlling an EMA-based braking arrangement in accordance with an embodiment of the present invention.
Figure 4:
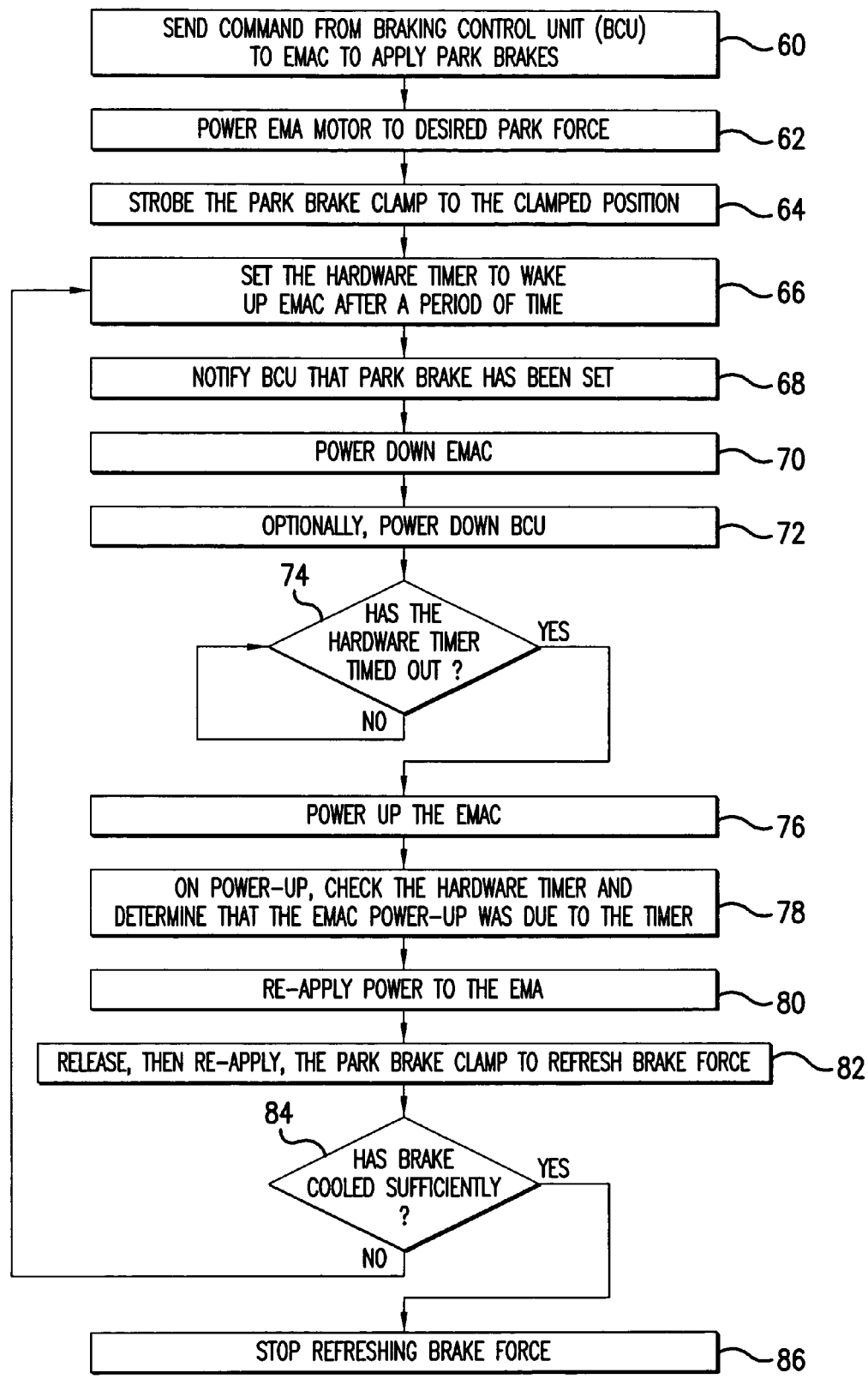
FIG. 4 is a flow chart illustrating a method of controlling an electronic braking system according to the present invention.

With reference to FIG. 3, to address this problem, a hardware timer circuit 44 is added to the EMA controller (EMAC) 46, which receives power on line 48 from a power supply (not shown). The hardware timer circuit 44 controls logic-level power to the EMAC 46 and is designed to operate with very low power. The sequence of operation is illustrated in the flow chart of FIG. 4 with reference to the elements of FIG. 3, as follows: in a step 60, braking control unit (BCU) 50 commands EMAC 46 to apply the park brake. In step 62, EMAC 46 powers EMA 52 motor (via line 54) to the desired park force, and in a step 64, EMAC 46 strobes the park brake clamp 32 (via line 56) to the clamped position. In step 66, EMAC 46 sets the hardware timer 44 to wake EMAC 46 up after a period of time. This time is a function of the brake temperature and the brake design. If brake temperature is not available, then a pre-determined schedule based on a characteristic of the brake is used instead.

In step 68, EMAC 46 notifies BCU 50 that the park brake has been set, and EMAC 46 powers down in step 70. In an optional step 72, BCU 50 also powers down. At this point, the park brake is applied, and the only power consumption is the hardware timer circuit 44, which is on the order of microamps.

When the hardware timer 44 has timed out at step 74, the EMAC 46 powers up at a step 76. On power-up, in step 78, the EMAC 46 checks the hardware timer 44 and determines that the power-up was due to the timer 44. In step 80 EMAC 46 re-applies power to the EMA based on a value read from non-volatile memory (NVM). At step 82 EMAC 46 releases, then re-applies, the park brake clamp. The park brake force has now been refreshed. At step 84, a determination is made as to whether the park brake has cooled sufficiently. This determination may be based on the amount of time since the brake was applied, a condition of the brake such as its temperature, or a predetermined schedule. If the park brake has not cooled sufficiently, the process repeats from step 66 above. When it is determined that the brake has cooled sufficiently, the system stops refreshing the brake force at step 86, and all power is shut off, including power to the hardware timer.

It should be recognized that additional variations of the above-described implementations may be reached without departing from the spirit and scope of the present invention.

I claim:

1. A method of performing a parking brake function using an electromechanical brake having a disk stack comprising the steps of:

providing an EMA including a ram and a rotatable shaft;

rotating the shaft in a first direction to move the ram against the disk stack to apply a given level of force to the disk stack;

providing a clamp;

applying opposing forces against opposite sides of the shaft with the clamp when the given level of force is applied to the disk stack;

powering down the EMA after applying opposing forces against opposite sides of the shaft;

a) powering up the EMA;
b) unclamping the shaft;
c) clamping the shaft;
d) powering down the EMA;
determining the temperature of the disk stack; and
repeating steps a-d until the temperature of the disk stack has dropped to a given level.

2. The method of claim 1 wherein the clamp comprises a bistable clamp.

3. The method of claim 1 comprising the additional step of repeating steps a-d a plurality of times.

4. The method of claim 1 comprising the additional step of repeating steps a-d a predetermined number of times at predetermined intervals.

5. The method of claim 1 including the additional steps of:
   i) providing a controller for controlling the EMA, the controller being shiftable between an active state and a low-power dormant state;
   ii) shifting the controller to the low-power dormant state after powering down the EMA;
   iii) shifting the controller to the active state after a predetermined time;
   iv) powering up the EMA;
   v) unclamping the shaft;
   vi) clamping the shaft; and
   vii) repeating ii-vi a number of times.

6. The method of claim 1 including the additional steps of:
   providing a controller for controlling the EMA, the controller being shiftable between an active state and a low-power dormant state;
   shifting the controller to the low-power dormant state after powering down the EMA;
   measuring the temperature of the disk stack; and
   periodically performing the following steps as long as the temperature is above a predetermined level:
   i) shifting the controller to the active state;
   ii) powering up the EMA;
   iii) unclamping the shaft;
   iv) clamping the shaft;
   v) powering down the EMA; and
   vi) shifting the controller to the dormant state.

7. The method of claim 6 including the additional step of providing a timer for shifting the controller between the active state and the dormant state.

8. The method of claim 7 including the additional step of powering down the controller and timer after the temperature is no longer above the predetermined level.

9. The method of claim 5 wherein said step of repeating steps b-d a number of times comprises the step of repeating steps ii-vi until a temperature of the disk stack reaches a predetermined level.

10. The method of claim 1 including the additional step of: refreshing the given level of force.

11. A method of controlling an electromechanical braking system having a disk stack comprising rotors movable with respect to stators comprising the steps of:
   a) providing an EMA including a rotatable shaft operably connected to a ram;
   b) applying a force to the disk stack to prevent relative movement of the rotors and stators by applying a given level of power to the EMA;
   c) securing the shaft when the force is applied;
   d) powering down the EMA;
   e) reapplying the given level of power to the EMA;
   f) releasing the shaft while preventing relative movement of the rotors and stators;
   g) re-securing the shaft while preventing relative movement of the rotors and stators; and
   h) powering down the EMA.

12. The method of claim 11 including the additional step of repeating steps e-h a number of times.

13. A method of performing a parking brake function using an electromechanical brake having a disk stack comprising the steps of:
   providing an EMA including a ram and a rotatable shaft;
   rotating the shaft in a first direction to move the ram against the disk stack to apply a given level of force to the disk stack;
   providing a clamp;
   applying a clamping force on the shaft with the clamp when the given level of force is applied to the disk stack;
   powering down the EMA after applying the clamping force on the shaft;
   a) powering up the EMA;
   b) unclamping the shaft;
   c) clamping the shaft;
   d) powering down the EMA;
   determining the temperature of the disk stack; and
   repeating steps a-d until the temperature of the disk stack has dropped to a given level.

14. The method of claim 13 wherein the clamp comprises a bistable clamp.

15. The method of claim 13 comprising the additional step of repeating steps a-d a plurality of times.

16. The method of claim 13 comprising the additional step of repeating steps a-d a predetermined number of times at predetermined intervals.

17. The method of claim 13 including the additional steps of:
   i) providing a controller for controlling the EMA, the controller being shiftable between an active state and a low-power dormant state;
   ii) shifting the controller to the low-power dormant state after powering down the EMA;
   iii) shifting the controller to the active state after a predetermined time;
   iv) powering up the EMA;
   v) unclamping the shaft;
   vi) clamping the shaft; and
   vii) repeating ii-vi a number of times.

18. The method of claim 13 including the additional steps of:
   providing a controller for controlling the EMA, the controller being shiftable between an active state and a low-power dormant state;
   shifting the controller to the low-power dormant state after powering down the EMA;
   measuring the temperature of the disk stack; and
   periodically performing the following steps as long as the temperature is above a predetermined level:
   i) shifting the controller to the active state;
   ii) powering up the EMA;
   iii) unclamping the shaft;
   iv) clamping the shaft;
   v) powering down the EMA; and
   vi) shifting the controller to the dormant state.

19. The method of claim 18 including the additional step of providing a timer for shifting the controller between the active state and the dormant state.

20. The method of claim 19 including the additional step of powering down the controller and timer after the temperature is no longer above the predetermined level.

21. The method of claim 17 wherein said step of repeating steps b-d a number of times comprises the step of repeating steps ii-vi until a temperature of the disk stack reaches a predetermined level.

22. The method of claim 13 including the additional step of:

refreshing the given level of force.

* * * * *